Figure 8:
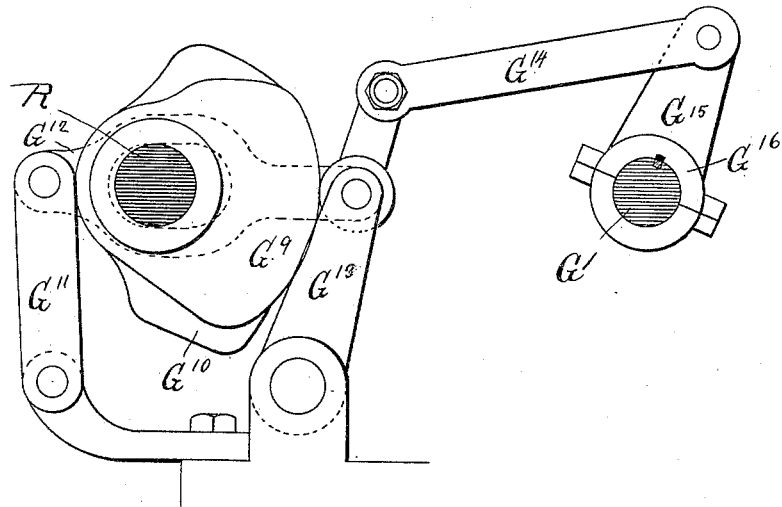

(No Model.) 9 Sheets—Sheet 1.
P. JORDAN.
CAN BODY MAKING MACHINE.
No. 436,792. Patented Sept. 23, 1890.
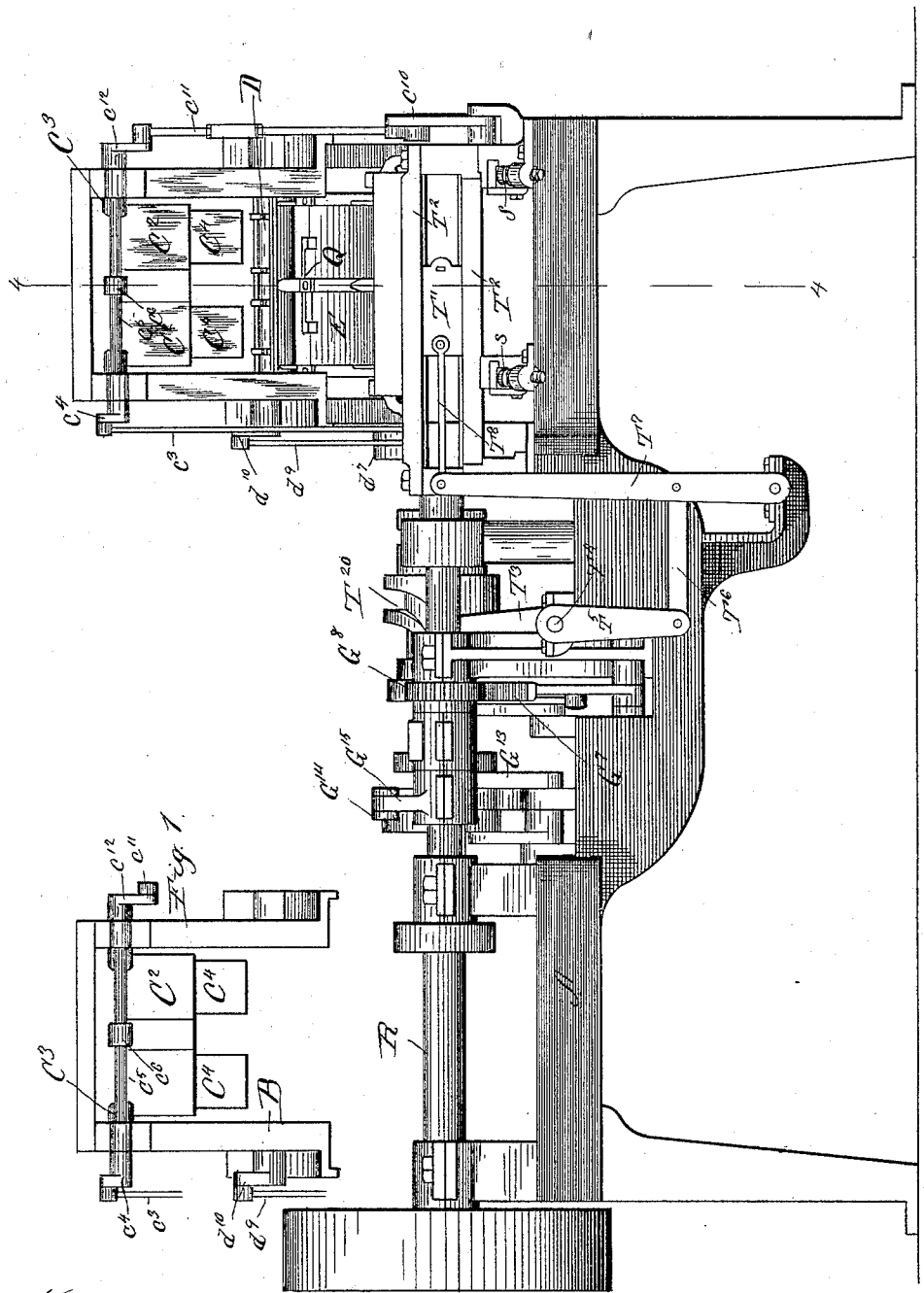
Witnesses:
Lew. E. Curtis
Mack A. Claflin
Inventor:
Peter Jordan
By Munday, Evarts & Adcock
His Attorneys

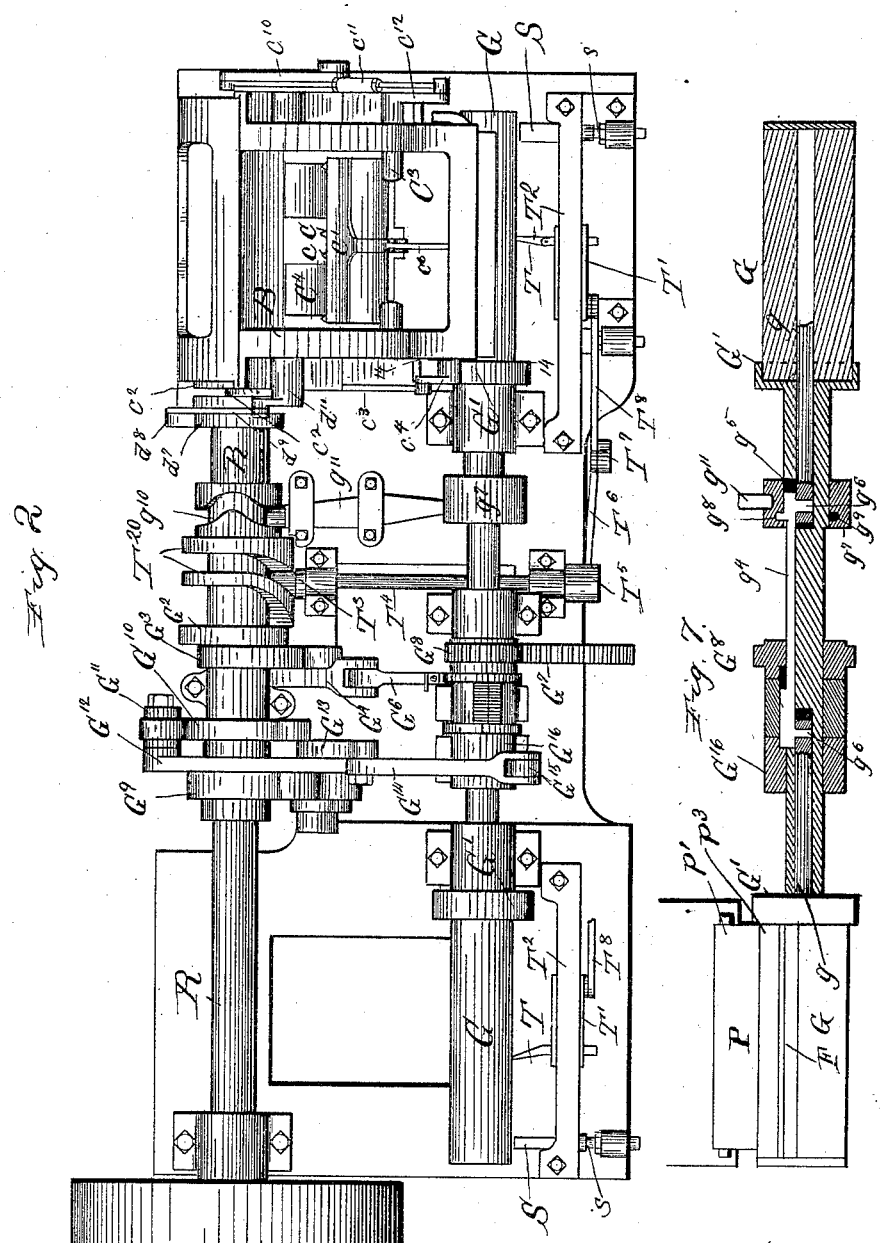

(No Model.) 9 Sheets—Sheet 3.
P. JORDAN.
CAN BODY MAKING MACHINE.
No. 436,792. Patented Sept. 23, 1890.
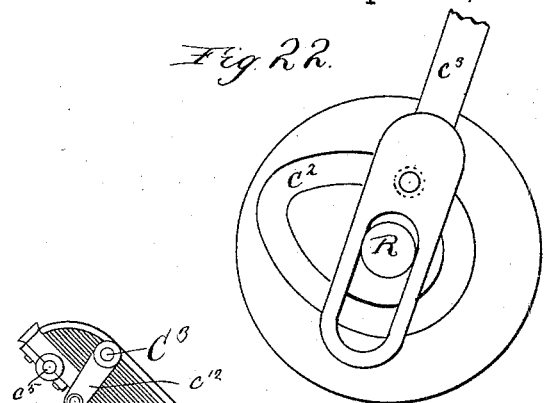
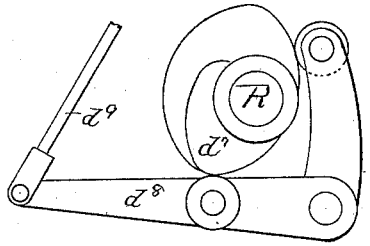
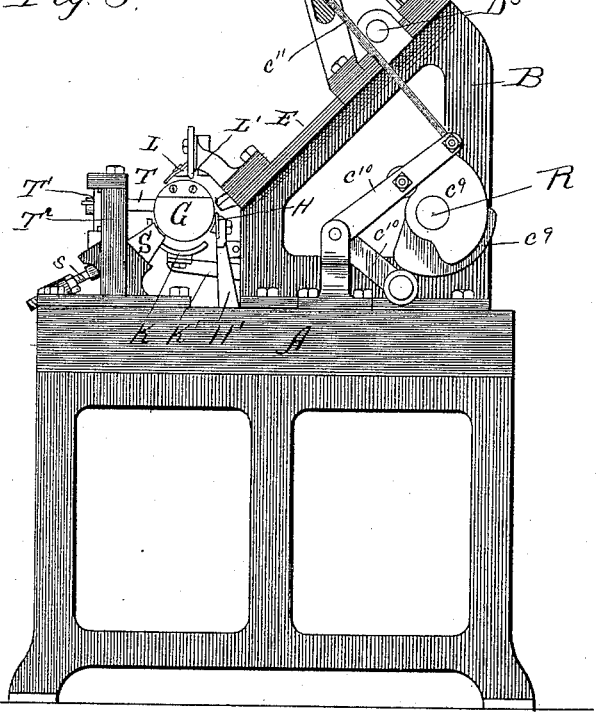
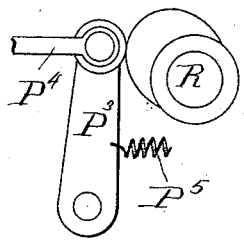
Witnesses:
Lew. C. Curtis
Mack A. Claflin
Inventor:
Peter Jordan
By Munday Evarts & Adcock
His Attorneys

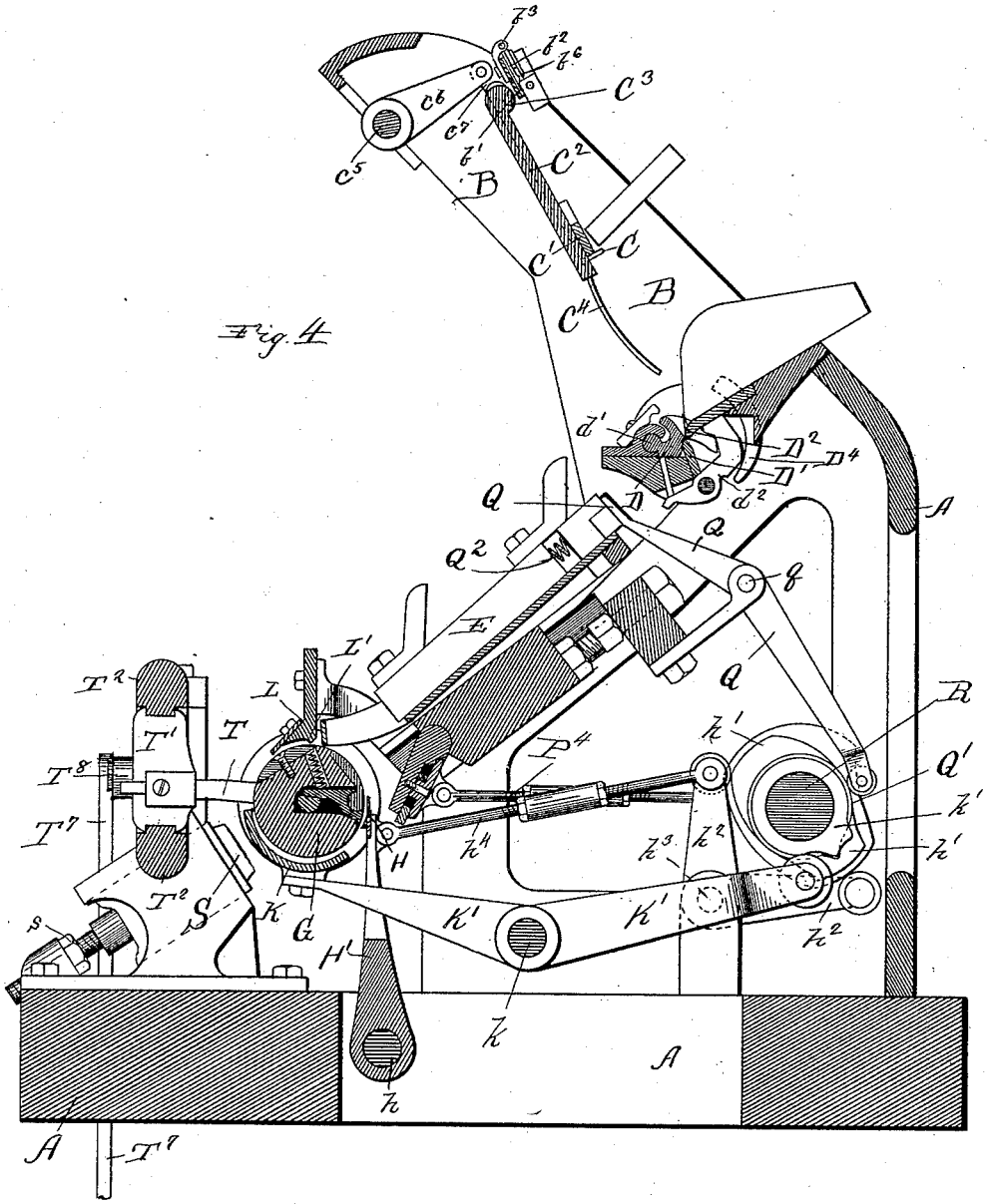

(No Model.) 9 Sheets—Sheet 5.
P. JORDAN.
CAN BODY MAKING MACHINE.
No. 436,792. Patented Sept. 23, 1890.
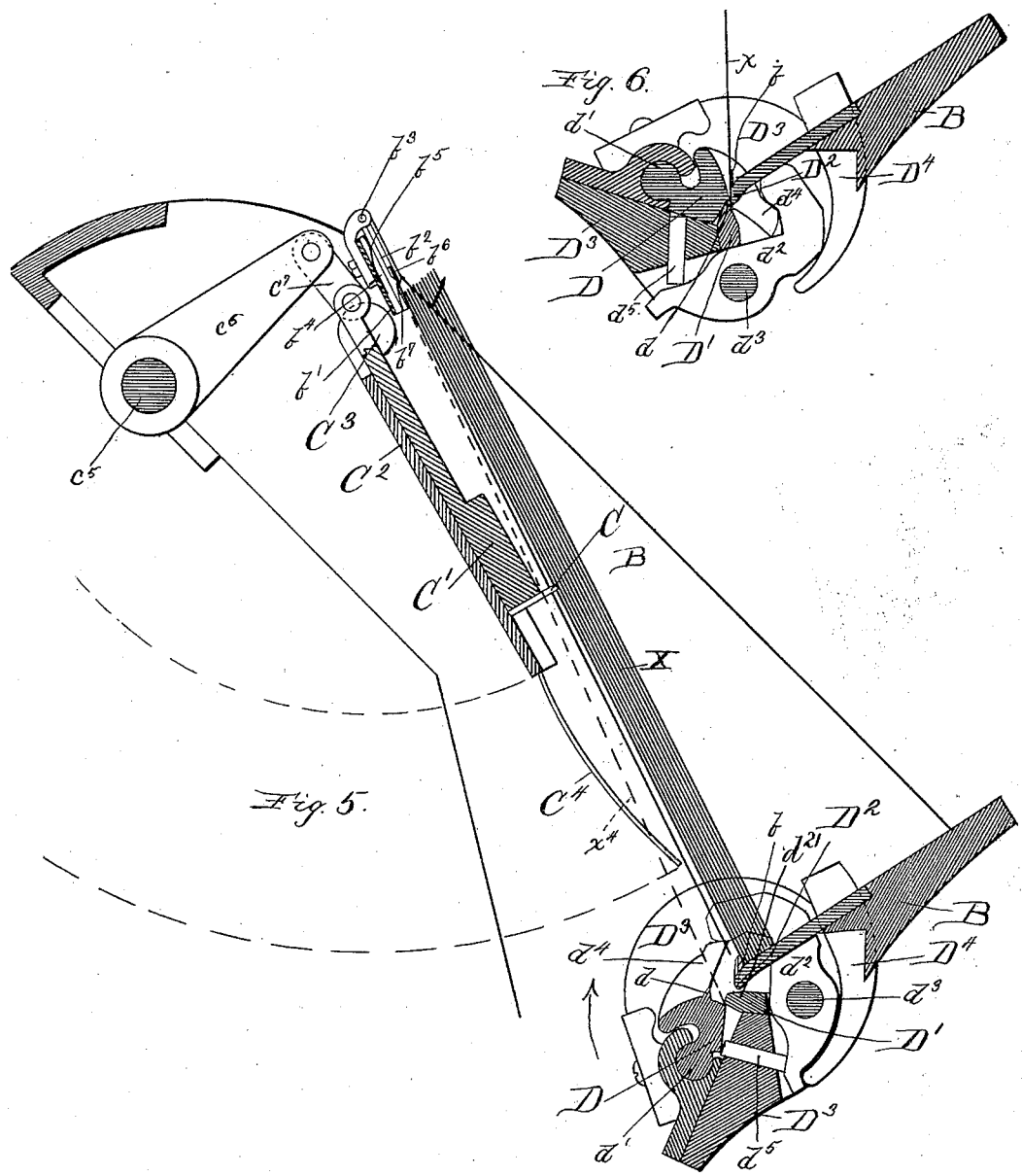
Witnesses:
Geo. E. Curtis.
Mack A. Claflin.
Inventor:
Peter Jordan
By Munday, Evarts & Adcock
His Attorneys.

(No Model.)  
9 Sheets—Sheet 6.

P. JORDAN.
CAN BODY MAKING MACHINE.

No. 436,792.  
Patented Sept. 23, 1890.

Witnesses:  
Geo. E. Curtis  
Mack A. Claflin.

Inventor:  
Peter Jordan  
By Munday, Evarts & Adcock  
his Attorneys.

(No Model.) 9 Sheets—Sheet 7.

P. JORDAN.
CAN BODY MAKING MACHINE.

No. 436,792. Patented Sept. 23, 1890.

Witnesses:
Geo. E. Curtis.
Mack A. Claflin.

Inventor:
Peter Jordan
By Munday, Evarts & Adcock
His Attorneys.

(No Model.) 9 Sheets—Sheet 8.
P. JORDAN.
CAN BODY MAKING MACHINE.
No. 436,792. Patented Sept. 23, 1890.
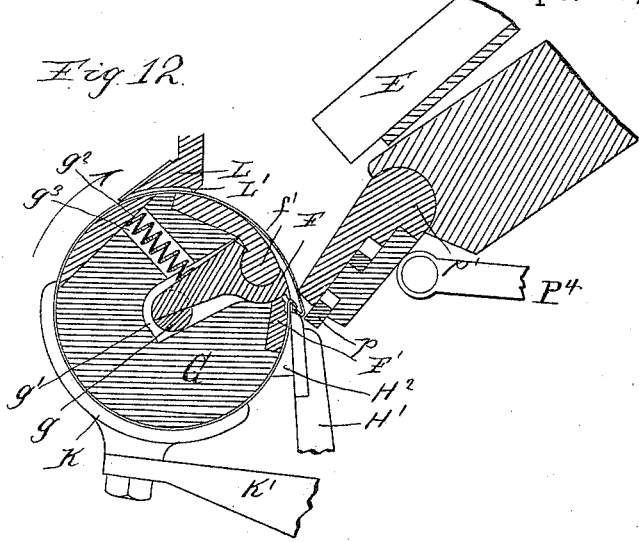
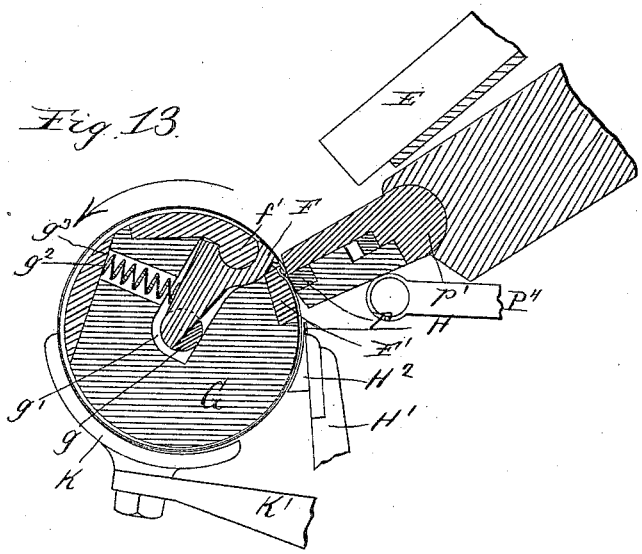
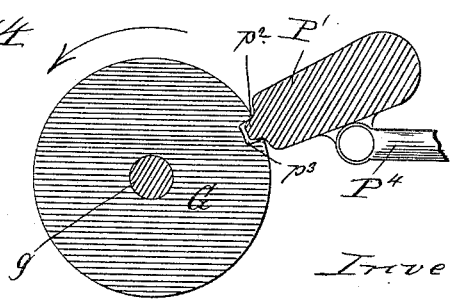

(No Model.) 9 Sheets—Sheet 9.

P. JORDAN.
CAN BODY MAKING MACHINE.

No. 436,792. Patented Sept. 23, 1890.

Witnesses:
Geo. E. Curtis.
Mack A. Claflin.

Inventor:
Peter Jordan

By Munday, Evarts & Adcock
His Attorneys.

THE NORRIS PETERS CO., PHOTO-LITHO., WASHINGTON, D. C.

UNITED STATES PATENT OFFICE.

PETER JORDAN, OF MAYWOOD, ILLINOIS, ASSIGNOR TO EDWIN NORTON, OF SAME PLACE, AND OLIVER W. NORTON, OF CHICAGO, ILLINOIS.

CAN-BODY-MAKING MACHINE.

SPECIFICATION forming part of Letters Patent No. 436,792, dated September 23, 1890.

Application filed March 22, 1889. Serial No. 304,237. (No model.)

*To all whom it may concern:*

Be it known that I, PETER JORDAN, a citizen of the United States, residing at Maywood, in the county of Cook and State of Illinois, have invented a new and useful Improvement in Can-Body-Making Machines, of which the following is a specification.

My invention relates to machines for making can-bodies.

The object of my invention is to provide a machine which will automatically feed the blank, form it into a can-body, and interlock and fold its edges into the usual lock-seam ready for soldering; also, to provide a machine which will produce two or more can-bodies at a time, and thus practically double, treble, or quadruple the capacity of the machine without materially increasing its cost.

The invention consists, in connection with a can-body-making mechanism, of a blank-feed device for automatically feeding the blanks one by one from a pile to the machine.

It also consists, in the combination, with a single horn around which the can-bodies are formed, of a multiplex can-body-forming mechanism or device adapted to operate upon two or more blanks at once, whereby two or more can-bodies may be produced simultaneously.

It also consists, in connection with such horn and multiplex can-body-forming mechanism, of a single extractor device for pushing the can-bodies simultaneously off the horn.

It also consists in the novel devices and novel combinations of parts and devices herein shown and described, and more particularly pointed out in the claims.

Figure 9:
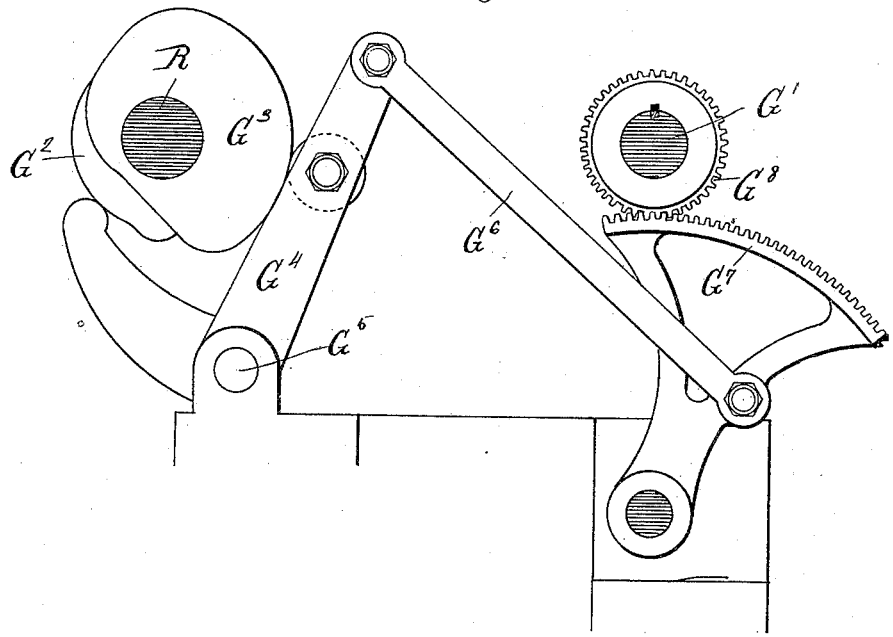
Figure 21:
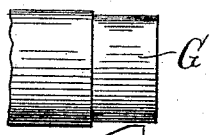
Figure 16:
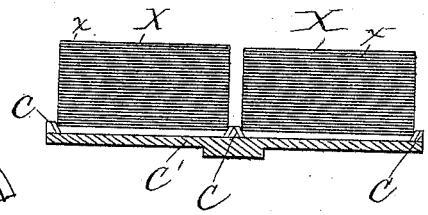
Figure 15:
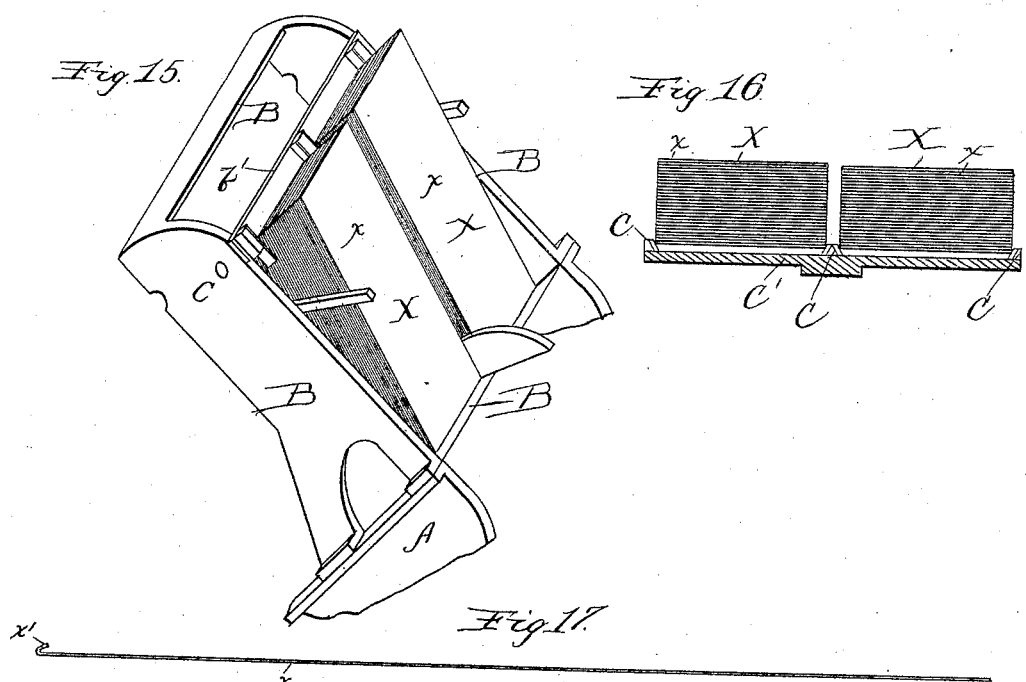
Figure 17:
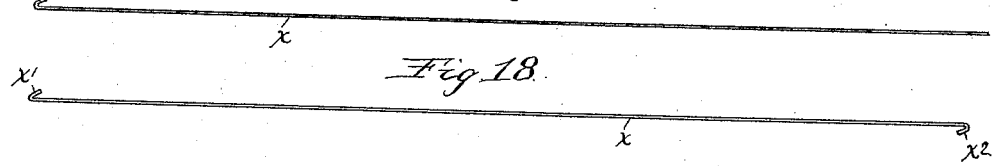
Figure 18:
Figure 19:
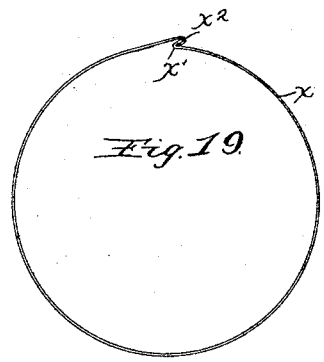
Figure 20:
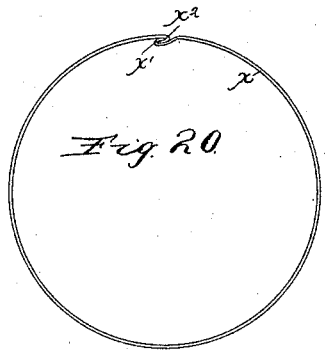

In the accompanying drawings, which form a part of this specification, and in which similar letters of reference indicate like parts, Figure 1 is a side elevation of a machine embodying my invention. Fig. 2 is a plan view. Fig. 3 is an end view. Fig. 4 is an enlarged section on line 4 4 of Fig. 1. Fig. 5 is an enlarged detail vertical sectional view, showing the blank-holder, blank-feed mechanism, and mechanism for forming the first fold or hook on the forward end of the blank. Fig. 6 shows the hook forming or folding mechanism of Fig. 5 in a different position. Fig. 7 is a longitudinal section of the horn-shaft. Figs. 8 and 9 are enlarged detail cross-sectional views of the driving-shaft and horn-shaft, showing the mechanism for operating the horn-shaft. Figs. 10, 11, 12, and 13 are detail cross-sectional views of the horn, showing the mechanism in different positions as performing the successive operations upon the blank. Fig. 14 is a cross-section of the horn taken on line 14 14 of Fig. 2, and showing the mechanism for operating the bumper or seam-squeezing device. Fig. 15 is a detail perspective view of the blank-holder; and Fig. 16 is a detail sectional view of the blank-feed device. Figs. 17, 18, 19, and 20 show the sheet or blank in successive stages or steps of operation performed upon it by the machine, Fig. 17 showing the blank with the first hook or fold formed upon one end, Fig. 18 showing the blank with the second hook or fold formed upon its opposite end, Fig. 19 showing the blank formed or curved into cylindrical shape and the two hooks interlocked, and Fig. 20 showing the interlocked hooks pressed or squeezed into the seam. Fig. 21 is a detail view of the horn-support. Figs. 22, 23, and 24 are detail views of cams for operating certain parts described.

In my invention the blank $x$ is first automatically fed from a pile or stack of blanks X to a suitable edge-folding mechanism or device, which forms the first hook $x'$ upon one end or side of the sheet. The blank is next automatically fed or conveyed to the edge-folding mechanism or device which forms the second hook or fold $x^2$ upon its opposite end or side. This second edge-folding device is preferably mounted in or upon the horn around and upon which the can-body is formed, so that this second edge-folding mechanism, which grasps the blank to make the second hook $x^2$, may be utilized or serve also as the means for clamping the blank to the horn. The blank is next by the rotation of the horn wrapped around the horn and the first hook or fold imposed or hooked over the second one, interlocking the two together. The next operation is to bump, squeeze, or compress the interlocked hooks or folds against the horn, and then the can-body or can-bodies are extracted or pushed off the horn by a suitable extractor device.

In order to form two can-bodies at a time by the same mechanism, the first edge-folding device, as well as the second edge-folding device and horn, is made long enough to operate upon two blanks at a time, separate guides, passages, or chutes being provided for the two separate blanks.

To enable the machine to operate upon four can-body blanks at a time, the edge-folding devices and bumping or squeezing device are duplicated at the opposite end of the horn.

In the drawings I have shown that form of edge-folding or hook-making mechanisms, horn-bumping or seam-squeezing device, and blank-feed device which I prefer to use and to combine together for practicing my invention; but the construction of each of these several devices may be greatly varied by those skilled in the art without departing from the principle of my invention and the broader features thereof.

In the drawings, A represents the frame of the machine. This may be of any suitable construction to give support or bearing to the several operative devices or parts of the machine.

B is the blank-holder, secured to the frame of the machine, and by which the pile or stock of blanks X is supported. This can-body-blank holder preferably consists of an inclined bottomless box having a projecting lip $b$ at its lower edge, upon which one edge of a pile of blanks X rests, and a ledge $b'$ upon which the other end of the blanks rests. The blank-holder B is also preferably furnished with one or more—preferably two—slotted arms $b^2$, pivoted at $b^3$ to the frame and mounted in suitable slots $b^4$ in the ledge $b'$, and which are pressed up against the pile of blanks X at the end thereof by springs $b^5$. The slot $b^6$ in these arms $b^2$ is just wide enough to admit one sheet or blank, so that only the lowermost blank of the pile can be pushed endwise into this slot, so that its forward end will free the shoulder or projection $b$. This slotted arm $b^2$ is used as a safeguard to prevent possibility of feeding two or more blanks at a time from the pile. This slotted safeguard $b^2$ is preferably mounted in a pivotal or yielding manner to insure its being in proper position against the end of the pile of blanks. The forward end $b^7$ of the slotted safeguard or arm $b^2$ is made tapering, as indicated in Fig. 5, so that this tapering portion may project slightly under the pile of blanks, and thus better guide the lowermost blank into the slot $b^6$.

C is the automatic feed device by which the blanks are fed or delivered one by one from the pile X. This feed device C may be of any suitable construction adapted to feed the blanks one by one from the pile; but as sheets of tin vary somewhat in thickness, the blank feed device which I prefer to employ is one which I have specifically devised for use in combination with the other operative parts of my machine. This preferred form of feed device consists in a pair of opposing blades C C, (see Fig. 16,) having knife-edges inclined to the plane of the sheet, so that when pressed up against the bottom of the pile of sheets the knife-edges of the blades C C will only engage the opposite edges of the lowermost sheet. The feeder of course preferably consists of two opposing blades; but if only one blade is employed it will sufficiently engage the lowermost sheet to pull it back over the ledge $b$. The feeder-blades C are secured to or made integral with a slide C', by which they are moved or reciprocated sufficiently to pull or push the lowermost blank over the ledge $b$ and permit its forward edge or end to move down between the edge-folding device D and the dies or jaws D' D², which oppose the hook-forming or edge-folding device D. The feeder-slide C' reciprocates on a swinging arm or frame C², which is pivoted to the frame at C³, in order that it may swing out of the way of the blank, and thus permit the rear end of the blank to swing down into position to be received by the second edge-folding or hook-forming device F, which is carried by the horn G. The swinging or pivotal movement of the blank about the edge-folding or hook-forming device D thus reverses or turns the blank end for end before it is delivered to the second hook-forming device F.

E is a guide, passage, or chute for the blank extending between the hook-forming devices D and F.

The pivotal arm C² is furnished with an extension C⁴, extending down near the end of the blank, to support the blank and prevent it from bending. After the feed device C moves backward to push the lowermost blank back sufficiently to permit its lower or forward end to drop over the supporting-ledge $b$ of the blank-holder, the pivoted arm or frame C² is caused to swing down slightly to release the pressure of the feeder-blades C C against the pile of blanks, and thus permit the now freed lowermost blank to slip down by its own gravity to the hook-former or edge-folder D.

I prefer to so arrange the blank-holder B and feed device F, as well as the blank-passage E, on an incline to the horizontal that the gravity of the blanks may be utilized to cause the blanks to move forward to the hook-formers or edge-folders D and F. It is obvious, however, that they may be differently arranged, and suitable means other than the gravity of the blanks employed to push the blanks forward to the edge-folders D and F.

I prefer, in order to utilize the gravity of the blank for the purpose of reversing or turning the blank end for end about the first hook-former D as a pivot, to arrange the blank-holder B and the passage E at an angle to each other, about as shown in the drawings; but my invention is not limited to this construction or arrangement wherein the gravity of the blank is made to aid in reversing or turning the blank end for end.

The hook-former or edge-folder D has a web or blade-like projection $d$, over which the fold or hook $x'$ is formed. The former D is pivoted at $d'$ to a rotary shaft or head $D^3$, journaled upon the frame of the machine. The die or jaw $D'$ is secured rigidly to this rotary head, and the die or jaw $D^2$ is secured to the rigid frame-work of the machine. This die is preferably, in fact, made integral with the end piece of the blank-holder, against which the forward end of the pile of blanks abuts. The hook-former D is given a vibratory movement on its pivot $d'$ by means of a cam-shaped lever $d^2$, pivoted at $d^3$ to the rotary head $D^3$, and which engages a stationary cam $D^4$, secured to the frame of the machine. As the head $D^3$ rotates, the cam-lever $d^2$ engages a wing or arm $d^4$, secured rigidly to the former D, which gives the former D its closing movement against the opposing dies $D'$ $D^2$, as clearly shown in Figs. 5 and 6. The former D is swung back or opened to release the hook $x'$ that has been formed, and to receive the succeeding blank, by a pin $d^5$, mounted in a suitable slot or hole in the rotary head $D^3$, which pin is engaged by the cam-lever $d^2$. The simple rotary or oscillatory movement of the head $D^3$ thus forms the first hook or edge fold $x'$ upon the forward end of the blank $x$.

Figure 10:
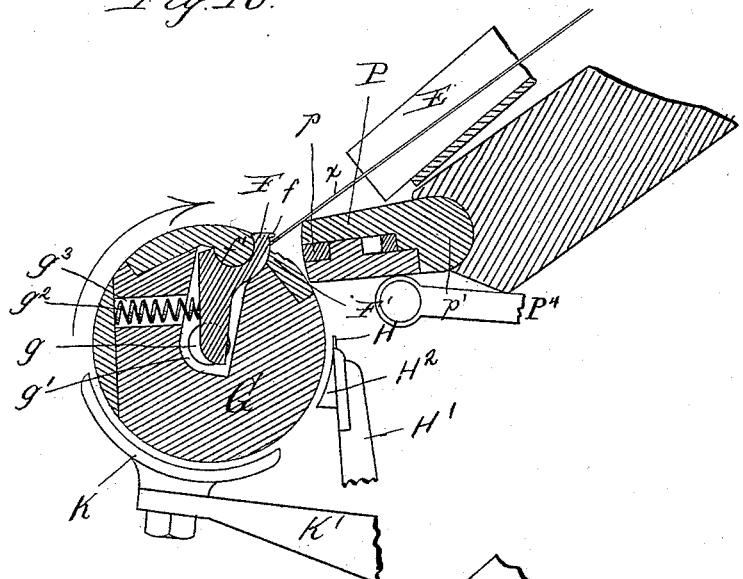
Figure 11:
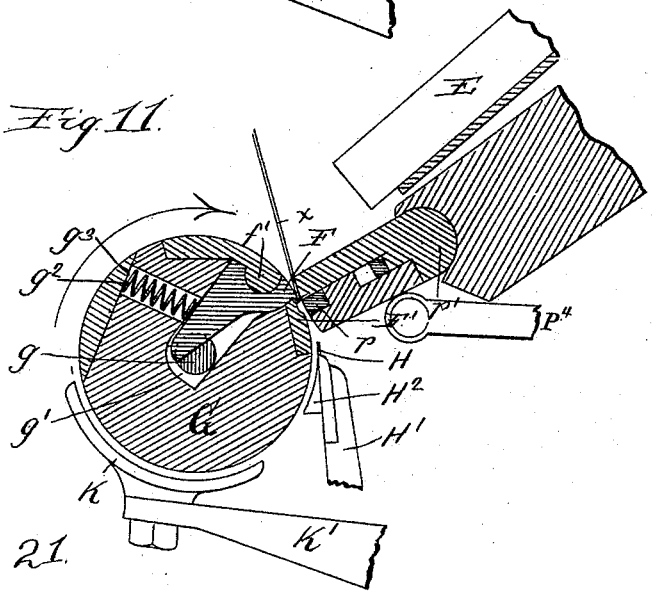

In Fig. 5 the dotted line $x^4$ represents the blank $x$ after it has fed down against the rotary die $D'$, which acts as a stop for the sheet. If the blank should drop down against and rest upon the side face $d^{21}$ of the die $D'$, as may sometimes happen, when the head $D^3$ rotates slightly from the position shown in Fig. 5 in the direction shown by the arrow, the blank $x^4$ will slip off the side face of the die $D'$ and rest upon the end face of said die, as shown by dotted line in Fig. 5. The movement of the former D on the head $D^3$, to which it is pivoted, will next clamp the end of the sheet or blank between the end face of the die $D'$ and the adjacent face of the web or blade $d$. The farther rotation of the head $D^3$ into the position shown in Fig. 6 completes the hook by carrying the blank against the stationary die or jaw $D^2$. As shown in Fig. 6, the dies $D'$ and $D^2$ constitute a female die, into which the edge of the sheet is pressed by the web or blade $d$ on the former D. The backward movement or rotation of the head $D^3$ now opens the former D and swings the blank $x$ down about the head $D^3$ as a pivot, so that the rear end of the blank will be fed foremost to the horn G and edge-folder F carried thereby. The edge-folder F has a lip or blade $f$, which operates to clamp the edge of the sheet against the opposing die or jaw $F'$, which is or should be correspondingly recessed. The former F is pivoted at $f'$ to the horn G, and it is operated by a sliding wedge or bar $g$, which, like the former F, is mounted in a suitable recess $g'$ in the horn G. The wedge $g$ operates to close the former F against the die $F'$, and a spring $g^2$, mounted in a recess $g^3$ in the horn, serves to open the jaw when the wedge or rod $g$ is withdrawn. The horn G is mounted in suitable bearings $G'$ on the frame of the machine, and is given a rotary movement in the direction indicated by the arrows in Figs. 10, 11, and 12, which rotary movement serves, after the end of the sheet is clamped between the former F and die $F'$, to wrap the blank or sheet around the horn, and thus form or shape up the can-body. In Fig. 10 the blank $x$ is shown fed down in position for its end to be clamped between the now open former F and the die $F'$. In Fig. 11 the same parts are shown with the former F closed and clamping the edge of the blank between itself and die $F'$. The rotation of the horn G in the direction indicated by the arrows in Figs. 10 and 11 now wraps the blank around the horn and at the same time completes the formation of the second hook or edge fold $x^2$. The act of wrapping the sheet or blank around the horn folds the same over the lip $f$ of the former F. The guides or shoes $H^2$ K L surrounding the horn serve to hold and bend the blank around the horn as the horn is rotated, one edge of the blank being clamped between the dies. This function may also be in part performed by the presser P, as will be clearly understood from Figs. 10 and 11. The horn makes somewhat more than a complete revolution into the position shown in Fig. 12.

H is a stop-blade, which engages the first hook or edge fold $x'$ as the blank is being wrapped around the horn by the rotation thereof. This stop-blade is arranged near the periphery of the horn, so that it will surely engage the first hook or fold $x'$ and hold it in position for interlocking with the second hook or fold $x^2$ of the blank, as shown in Fig. 12. The stop-blade H is preferably mounted movably, so that it may be moved toward or from the horn, as desired. I prefer to mount this stop-blade on an arm or lever $H'$, pivoted at $h$ to the frame of the machine, so that it may be swung to or from the horn. The arm $H'$ also preferably carries a curved shoe or presser device $H^2$, which may be made integral with the stop-blade H or the pivoted arm $H'$. The arc of this shoe should correspond with that of the horn. The purpose of this shoe is to press the inner end of the blank $x$, which carries the first and now outwardly-projecting hook $x'$, flat against the horn during the operation of interlocking the second and now inwardly-projecting hook $x^2$ with the first hook $x'$, said second hook $x^2$ hooking over the first hook $x'$, as is clearly indicated in Fig. 12.

The horn G being a solid one, as contradistinguished from an expansible or compressible one, is made smaller than the finished can-body, so as to permit the overlapping of the hook $x^2$ over the hook $x'$.

To insure the overlapping and interlocking of the hooks $x^2$ $x'$, a second guide-shoe K is provided, which, like the shoe $H^2$, is preferably made movable, so that it may operate to press the blank $x$ more snugly against the periphery of the horn and cause the lap or excess portion of the can-body to continue around the horn to the part where it is needed to permit or cause the hook $x^2$ to overlap or hook over the hook $x'$, as is indicated in Fig. 12. This guide-shoe K is preferably mounted upon or secured to the end of a lever K', pivoted at $k$ to the frame of the machine. A third guide-shoe L is located farther around the horn, the same being preferably secured rigidly to the frame of the machine. This third guide-shoe is designed simply to preserve the cylindrical shape of the can-body after the former F opens and releases the hook $x^2$ preparatory to the interlocking or overlapping of the hooks $x^2$ $x'$. It fits the horn somewhat loosely, but is provided with a cam-like projection L', which serves to keep the blank close to the horn. This will be clearly understood from Figs. 4 and 12. After the horn G revolves around nearly to the position indicated in Fig. 12, the former F is opened, thus releasing the hook $x^2$, and the movable guide-shoes $H^2$ and K being then pressed up against the horn, the hook $x^2$ is lapped over or carried beyond the hook $x'$, and while the blank and horn are in this position the bumper or seam-squeezing device P, which carries a movable blade or projection $p$, moves or swings up into the position indicated in Fig. 12 and crowds or pushes the fold or hook $x^2$ into the hook $x'$. This is clearly indicated in Fig. 12. The horn G now rotates backward to the position indicated in Fig. 13, thus bumping or squeezing the interlocked folds or hooks $x'$ $x^2$ into a solid seam. The movable blade or projection $p$ slides on the bumper P, so that its face shuts in flush with the operative face of the bumper. The seam-squeezer or bumper P is preferably pivoted to the frame at $p'$, and it is furnished with an operating-arm $P^4$, actuated in any suitable manner. The blade $p$ of the presser P is mounted in a suitable slot or way in the presser P, the blade itself being also slotted to limit its outward movement, as is clearly shown in Figs. 12 and 13. The blade moves outward by its own gravity and is pushed back by contact with the horn. It may, however, be moved by any suitable means.

The passage or chute E, as shown in the drawings, is sufficiently inclined to permit or cause the blanks to slide down to the former F and horn G by their own gravity; but I prefer to provide a positive device for moving the sheets along this passage E to the former F. This feed-pusher device may preferably consist of a simple feed-lever Q, pivoted at $q$ to the frame and actuated by any suitable means.

To properly support the horn against the thrust of the plunger or squeezer during the squeezing operation, I provide at each end of the horn a support S, which is preferably secured at $s$ on the frame of the machine diametrically opposite the pivot $p'$ of the plunger P. This horn-support S is made slightly tapering to permit the can-bodies to enter between the horn and support, (see Fig. 21,) and it is located the full thickness of the blank away from the horn to permit the free extraction of the can-body after the seam is closed. The slight spring of the horn brings it against the support to resist the thrust of the squeezing mechanism. By the backward rotation of the horn before referred to, a tooth or projection $p^2$ on the operating-arm P' of the seam-squeezer P engages a similar groove or recess $p^3$ in the horn G, and thus insures the opposing action of the support S to the thrust or pressure of the squeezer P.

T is the extractor or device which pushes the finished can-bodies from the horn. It or the slide T', to which it is attached, reciprocates in suitable guides $T^2$ on the frame of the machine.

The blank-holder B, the feed device C, and the chute or passage E are duplicated on each side of the machine, there being four of each in the machine shown in the drawings, these parts being separate for each can-body blank; but the edge-folders or hook-formers D and F, horn G, stop-blade H, guide-shoes $H^2$, K, and L, bumper or squeezer P, blank-pusher Q, and extractor T are combined and arranged to operate upon two can-bodies or can-body blanks at a time, the edge-folders, &c., being simply made long enough to operate upon two can-bodies instead of one. It will thus be seen that by very little additional expense in the construction of my improved machine it may be made to make two can-bodies at a time on each side.

It should be understood that while one feature of my invention consists in the means I employ to make two or more can-bodies simultaneously, other features of my invention are not confined to this double-acting construction.

It should also be understood that the edge-folders D and F and other parts may operate upon three or more adjacent blanks or can-bodies at a time instead of two, as shown in the drawings.

I have now described one end or half of the machine which serves to make two can-bodies at a time, and as the other end or half of the machine is an exact duplicate of the end or half already described, it is of course not necessary to duplicate the description.

In Fig. 1 of the drawings the duplicate mechanism at the left hand of the machine is indicated, some of the parts, however, being omitted or broken away to better show parts that would otherwise be concealed.

The operating mechanism or means for communicating to the several operative parts their required movements, as before described, may of course be greatly varied by the skilled mechanic. The required movements may be communicated to the several operating parts or devices by any suitable means desired, and I desire it to be understood that my invention is not limited to any particular means or mechanism for communicating to the operating parts their movements.

In the drawings I have shown a suitable form of operating mechanism for communicating to the various parts before described their movements, and I will now proceed to describe these operating or motion-producing devices.

The feed-slide $C'$, which carries the feed device C, is reciprocated on the swinging guide-arm $C^2$ by means of a cam $c^2$, Fig. 22, on the main driving-shaft R, through a link $c^3$, connected with the arm $c^4$ of a rock-shaft $c^5$, having an arm $c^6$, connected by a link $c^7$ with the feeder-slide $C'$.

The swinging guide-arm $C^2$ is rotated or swung about its pivot $C^3$ by means of a cam $c^9$ on the main driving-shaft R, through a lever $c^{10}$ and link $c^{11}$, connected to the crank-arm $c^{12}$, secured to the pivot or rock-shaft $C^3$.

The rotary head or shaft $D^3$, which carries the hook-former D and die $D'$, is operated by means of a cam $d^7$, Fig. 23, on the main driving-shaft R, through the lever $d^8$, connecting-link $d^9$, and crank-arm $d^{10}$, secured to said rotary head or shaft $D^3$.

The means for operating the hook-former D by the rotation of the head $D^3$ has already been described.

The former F, which is carried by the horn G, is operated by the wedge $g$, as before described, by means of a sliding key $g^4$, mounted in a groove $g^5$ in the shaft $G'$ of the horn G, and connected with the wedge $g$ by a projection $g^6$, fitting in a slot or hole in the wedge $g$; and connected to a sliding collar or sleeve $g^7$ by a projection $g^8$, fitting in an annular groove $g^9$ in said sleeve. The sleeve $g^7$ is reciprocated as required to move the wedge $g$ by means of a cam $g^{10}$ on the main driving-shaft R, and a lever $g^{11}$ connected to said sleeve $g^7$.

The horn G or its shaft $G'$ is given its forward rotation to wrap the blank $x$ around the horn by means of cams $G^2$ $G^3$ on the main driving-shaft R, through the bent lever $G^4$, pivoted at $G^5$ to the frame, connecting-link $G^6$, segment-gear $G^7$, and gear $G^8$ on the shaft $G'$, and the horn is given its backward rotation, as before described, by means of cams $G^9$ $G^{10}$ on the main driving-shaft, pivoted guide-arm $G^{11}$, connecting-link $G^{12}$, lever $G^{13}$, connecting-link $G^{14}$, and crank-arm $G^{15}$, secured to the sleeve or collar $G^{16}$ on the shaft $G'$. The shaft $G'$ is alternately fixed to the sleeve $G^{16}$ and to the gear $G^8$ by means of a sliding key. I prefer to utilize for this purpose the same sliding key $g^4$ which is used to operate the wedge $g$, though a separate key may of course be employed.

The stop-blade H and guide-shoe $H^2$, which are carried by the pivoted arm $H'$, are operated by a cam $h'$ on the main driving-shaft R through the lever $h^2$, pivoted at $h^3$ to the frame and connected by a link $h^4$ to the movable arm $H'$.

The guide-shoe K, carried by the lever $K'$, is operated by a cam $k'$ on the main driving-shaft R.

The bumper or seam-squeezing device P is swung or rotated on its rock-shaft or pivot $p'$ by means of a cam $P^2$, Fig. 24, on the main driving-shaft R through a lever $P^3$ and connecting-link $P^4$, pivoted to the operating-arm $P'$, which is secured to the shaft $p'$. This cam $P^2$ and connecting mechanism are preferably simply used to throw the tooth or projection $p^2$ into and out of engagement with the recess $p^3$ in the horn, the rotation of the horn then serving to further rotate the squeezer P into the line joining the axes of the horn and shaft $p'$. A spring $P^5$ holds the operating-arm $P'$ in position for the tooth $p^2$ to engage the recess $p^3$ in the horn.

The blank pusher or feeder Q is operated by a cam $Q'$ on the main driving-shaft R. A spring $Q^2$, mounted on the middle or dividing rib or bar of the feed-chute E, serves to retract the feeder Q.

The can-body extractor T or its slide $T'$ is operated by a cam $T^{20}$ on the main driving-shaft through the lever $T^3$, rock-shaft $T^4$, lever $T^5$, connecting-link $T^6$, lever $T^7$, and link $T^8$, which is pivoted to said slide $T'$.

What I claim is—

1. The combination, with two or more can-body-blank holders, of two or more automatic blank-feeders and a single can-body-making mechanism adapted to operate upon two or more blanks at a time, substantially as set forth.

2. The combination, with two or more can-body-blank holders and feeders, of a single hook-forming device adapted to operate upon two or more can-bodies at a time, substantially as specified.

3. The combination, with two or more blank-holders B, of two or more blank-feeders C C C C and a single slide or movable device for operating all of said feeders, substantially as specified.

4. The combination, with two or more blank-holders B, of two or more blank-feeders C C C C, a single slide or movable device for operating all of said feeders, and a single edge-folder or hook-former simultaneously operating upon said blanks, substantially as specified.

5. A can-body-forming mechanism having a single horn and adapted and arranged to form two or more can-bodies simultaneously—one or more upon each end or side of the machine—in combination with two or more separate mechanisms for delivering two or more blanks thereto and mechanism for extracting the can-bodies from the horn, substantially as specified.

6. In a can-body-forming mechanism, a single horn supported on a central bearing and having supports on each side of such fixed bearing, substantially as specified.

7. In a can-body-forming mechanism, a single horn supported on a central bearing and having supports on each side of such fixed bearing, in combination with can-body-forming mechanism on each side of said central bearing, substantially as specified.

8. The combination, in a can-body-making machine, with a can-body-blank holder, of an automatic blank-feed device, an edge-folder or hook-forming mechanism, a rotatable horn, a second hook-former carried by the horn and operating by the rotation of the horn to wrap the blank around the horn, a device for interlocking the hooks formed upon the blanks, a seam-squeezing device, a horn-support to resist the pressure of the squeezer, and an extractor for removing the can-body from the horn, substantially as specified.

9. The combination, with a can-body-blank holder, of an automatic feed device, a rotatable hook-former mechanism, and a rotatable can-body horn furnished with a second hook-former mechanism, substantially as specified.

10. The combination, with a can-body-blank holder, of an automatic feed device, a rotatable hook-former mechanism, a rotatable can-body horn furnished with a second hook-former mechanism, and a stop blade or device to engage and hold one of the hooks formed upon the blank, substantially as specified.

11. The combination, with a can-body-blank holder, of an automatic feed device, a rotatable hook-former mechanism, a rotatable can-body horn furnished with a second hook-former mechanism, a stop blade or device to engage and hold one of the hooks formed upon the blank, and a guide shoe or device for carrying the lap around the horn and causing one of the hooks to overlap the other, substantially as specified.

12. The combination, with a can-body-blank holder, of an automatic feed device, a rotatable hook-former mechanism, a rotatable can-body horn furnished with a second hook-former mechanism, a stop blade or device to engage and hold one of the hooks formed upon the blank, a guide shoe or device for carrying the lap around the horn and causing one of the hooks to overlap the other, and a movable device for pushing the two hooks on the blank together or interlocking them, substantially as specified.

13. The combination, with a can-body-blank holder, of an automatic feed device, a rotatable hook-former mechanism, a rotatable can-body horn furnished with a second hook-former mechanism, a stop blade or device to engage and hold one of the hooks formed upon the blank, a guide shoe or device for carrying the lap around the horn and causing one of the hooks to overlap the other, a movable device for pushing the two hooks on the blanks together or interlocking them, and a device for squeezing the interlocked folds or hooks into a seam, substantially as specified.

14. The combination, with a can-body-blank holder, of an automatic feed device, a rotatable hook-former mechanism, a rotatable can-body horn furnished with a second hook-former mechanism, a stop blade or device to engage and hold one of the hooks formed upon the blank, a guide shoe or device for carrying the lap around the horn and causing one of the hooks to overlap the other, a movable device for pushing the two hooks on the blanks together or interlocking them, a device for squeezing the interlocked folds or hooks into a seam, and a movable support for the horn to resist the pressure of the seam-squeezing device, substantially as specified.

15. The combination, with a can-body-blank holder, of an automatic feed device, a rotatable hook-former mechanism, a rotatable can-body horn furnished with a second hook-former mechanism, a stop blade or device to engage and hold one of the hooks formed upon the blank, a guide shoe or device for carrying the lap around the horn and causing one of the hooks to overlap the other, a movable device for pushing the two hooks on the blanks together or interlocking them, a device for squeezing the interlocked folds or hooks into a seam, a movable support for the horn to resist the pressure of the seam-squeezing device, and an extractor or device for pushing the can-body off the horn, substantially as specified.

16. The combination, with a blank-holder, of an automatic blank-feed device, an edge-folding mechanism, and a second edge-folding mechanism and a feed passage or chute between said first and second edge-folding mechanisms, substantially as specified.

17. The combination, with a blank-holder, of an automatic blank-feed device, an edge-folding mechanism, a second edge-folding mechanism, and a can-body-former horn, said second edge-folding mechanism being carried by said horn and having a movable jaw mounted on said horn to clamp the edge of the blank, and mechanism for revolving said horn, substantially as specified.

18. The combination of a can-body-blank holder arranged at an angle to the horizontal with a blank-feed device, a hook-forming mechanism, a second hook-forming mechanism, and a can-body-blank feed passage or chute extending between the first hook-forming mechanism and the second hook-forming mechanism, substantially as specified.

19. The combination of a can-body-blank holder arranged at an angle to the horizontal with a blank-feed device, a hook-forming mechanism, a second hook-forming mechanism, a can-body-blank feed passage or chute extending between the first hook-forming mechanism and the second hook-forming mechanism, said blank-feed passage or chute being also arranged at an angle to the horizontal, substantially as specified.

20. The combination of a can-body-blank holder arranged at an angle to the horizontal with a blank-feed device, a hook-forming mechanism, a second hook-forming mechanism, a can-body-blank feed passage or chute extending between the first hook-forming mechanism and the second hook-forming mechanism, and a pusher device for pushing the blank along said feed passage or chute, substantially as specified.

21. The combination of a can-body-blank holder arranged at an angle to the horizontal with a blank-feed device, a hook-forming mechanism, a second hook-forming mechanism, a can-body-blank feed passage or chute extending between the first hook-forming mechanism and the second hook-forming mechanism, said blank-feed passage or chute being also arranged at an angle to the horizontal, and a pusher device for forcing the blank along said feed passage or chute into said second edge-folding mechanism, substantially as specified.

22. The combination of a can-body-blank holder B, having ledge $b$, with a hook-forming mechanism, a second hook-forming mechanism, and an automatic feed device adapted to engage the lowermost blank and mounted on a swinging or movable frame to permit the blank to swing or turn about said first hook-forming mechanism as a pivot and thus reverse or turn the sheet end for end, substantially as specified.

23. The combination, with a blank-holder and blank-feeder, of a rotary hook-forming mechanism and a second hook-forming mechanism, said first-mentioned hook-forming mechanism operating to turn the blank end for end to deliver it to said hook-forming mechanism, substantially as specified.

24. The combination, with a can-body-blank holder and feeder, of a rotatable hook-forming mechanism and a second hook-forming mechanism mounted upon a revoluble can-body-former horn, said first-mentioned hook-forming mechanism operating to turn the blank end for end to deliver it to the second hook-former mechanism, substantially as specified.

25. The combination, with a can-body holder B, having ledge $b$, of feeder device C C, having slide C', swinging frame C², hook-former mechanism carried by a rotatable head, passage E, and a second hook-former mechanism, substantially as specified.

26. The combination, with a can-body holder B, having ledge $b$, of feeder device C C, having slide C', swinging frame C², hook-former mechanism carried by a rotatable head, passage E, a second hook-former mechanism, and a can-body-former horn carrying said second hook-forming mechanism, substantially as specified.

27. The combination, with a can-body-making mechanism, of a can-body-blank holder, an automatic feed device for feeding or delivering the blanks one by one, and a movable safeguard to prevent the feeding of more than one blank at a time, substantially as specified.

28. The combination, with a can-body-making mechanism, of a can-body-blank holder, a movable blank-feed device below said holder, adapted to engage the lowermost blank in the holder, and a movable safeguard device to prevent the feeding of more than one blank at a time, substantially as specified.

29. The combination, with a blank-holder, of a blank-feed device consisting of a movable blade C, adapted to engage the edge or corner of the blank, substantially as specified.

30. The combination, with a blank-holder, of a blank-feed device consisting of a pair of movable blades C C, adapted to engage the opposite edge corners of the blank, substantially as specified.

31. The combination of a blank-holder B, having an edge or lip $b$ for the end of the blanks to rest upon and a feed device adapted to engage the lowermost blank and slip it back of said ledge, substantially as specified.

32. The combination of a blank-holder with a feed device and a safeguard device consisting of a slotted arm adapted to receive but a single blank at a time, substantially as specified.

33. The combination of a blank holder with a feed device for slipping one blank at a time from the pile of blanks in the holder, and a pivotal slotted arm adapted to receive but a single blank at a time to act as a safeguard to prevent the feeding of more than one blank at a time, substantially as specified.

34. The combination of a blank-holder B, having lips $b$ and ledge $b'$, opposing inclined edged feed-blades C C, and reciprocating slide C', carrying said feed-blades, substantially as specified.

35. The combination of a blank-holder B, having lips $b$ and ledge $b'$, opposing inclined edged feed-blades C C, reciprocating slide C', carrying said feed-blades, and slotted safeguard-arm $b^2$, substantially as specified.

36. The combination, with a blank-holder, of a blank-feeder below said holder adapted to engage the lowermost blank and a swinging arm upon which said feeder is mounted, substantially as specified.

37. The combination, with blank-holder B, having ledge $b$, of a reciprocating feeder C, a slide C', and swinging arm or frame C², substantially as specified.

38. The combination, with a can-body-blank holder, of a hook-forming or edge-folding mechanism consisting of a rotatable head having a movable former-die D and a die D' for clamping the edge of the blank and an automatic feed device for feeding the blanks one by one from the pile of blanks in the holder to the hook-forming mechanism, substantially as specified.

39. The combination, with an edge-folding or hook-forming mechanism, of a blank-holder, an automatic feed device mounted below the holder and adapted to engage the lowermost blank in the holder, and a movable safeguard device to prevent the feeding of more than one blank at a time, substantially as specified.

40. The combination, with an edge-folding mechanism, of a blank-holder having a lip for supporting the blanks and an automatically-movable blank-feed device C, adapted to engage the edge of the lowermost sheet or blank, substantially as specified.

41. The combination, with a hook-forming device, of a blank-holder arranged at an angle to the horizontal, an automatic feed device adapted to disengage the blanks one by one from the holder and permit them to drop or slide by their own gravity to said hook-forming device, and a movable safeguard device to prevent the feeding of more than one blank at a time, substantially as specified.

42. The combination, with a hook-forming device, of a blank-holder arranged at an angle to the horizontal and an automatic feed device adapted to disengage the blanks one by one from the holder and permit them to drop or slide by their own gravity to said hook-forming device, said feed device being mounted upon a movable or swinging frame, substantially as specified.

43. The combination, with a hook-forming mechanism, of a can-body holder arranged at an angle to the horizontal and having a lip $b$, a feed device C C, adapted to engage the lowermost blank, its slide C', and a slotted safeguard device $b^2$, substantially as specified.

44. The combination, with a hook-forming mechanism, of a can-body holder arranged at an angle to the horizontal and having a lip $b$, a feed device C C, adapted to engage the lowermost blank, its slide C', a slotted safeguard device $b^2$, and movable frame C$^2$, on which said slide C' reciprocates, substantially as specified.

45. The combination, with a rotatable head, of a die fixed thereto, an edge-folding device mounted movably on said head, a fixed die or jaw on the frame of the machine, a blank-feeder, mechanism for automatically operating said feeder, mechanism for automatically operating said edge-folding device, and a rotatable head, substantially as specified.

46. The combination of rotatable head D$^3$, hook-former D, and die D' for clamping the end edge of the sheet between them, and a cam and connecting mechanism for operating said former D by the rotation of said head D$^3$, substantially as specified.

47. The combination of head D$^3$ with hook-former D, die D', die D$^2$, a blank-holder, and an automatic blank-feed device, mechanism for automatically operating said former D, and mechanism for automatically operating said feed device, substantially as specified.

48. The combination of head D$^3$ with hook-former D, die D', die D$^2$, a blank-holder B, having lip $b$, and an automatic blank-feed device C C, adapted to engage the lowermost blank, substantially as specified.

49. The combination of head D$^3$ with hook-former D, die D', die D$^2$, a blank-holder B, having lip $b$, an automatic blank-feed device C C, adapted to engage the lowermost blank, and a slotted safeguard device, substantially as specified.

50. The combination of head D$^3$ with hook-former D, die D', die D$^2$, a blank-holder B, having lip $b$, an automatic blank-feed device C C, adapted to engage the lowermost blank, slide C', and swinging frame C$^2$, upon which said slide C' is mounted, substantially as specified.

51. The combination of head D$^3$ with hook-former D, die D', die D$^2$, a blank-holder B, having lip $b$, an automatic blank-feed device C C, adapted to engage the lowermost blank, slide C', swinging frame C$^2$, upon which said slide C' is mounted, and a pivotal slotted safeguard device $b^2$, substantially as specified.

52. The combination of rotary head D$^3$, die D', hook-former D pivoted thereto, cam-lever $d^2$, and stationary cam D$^4$, substantially as specified.

53. The combination of rotary head D$^3$, hook-former D pivoted thereto, die D', cam-lever $d^2$, and stationary cam D$^4$, said hook-former D having an arm or projection adapted to engage an arm or projection on said cam-lever, and a pin $d^5$, extending through said head between said former D and cam-lever, substantially as specified.

54. The combination of rotary head D$^3$, hook-former D pivoted thereto, die D', cam-lever $d^2$, stationary cam D$^4$, and stationary die D$^2$, substantially as specified.

55. The combination of rotary head D$^3$, hook-former D, pivoted thereto, die D', cam-lever $d^2$, and stationary cam D$^4$, said hook-former D having an arm or projection adapted to engage an arm or projection on said cam-lever, a pin $d^5$, extending through said head between said former D and cam-lever $d^2$, and stationary die D$^2$, substantially as specified.

56. The combination, with a rotatable can-body-former horn, of an edge-folding or hook-forming device carried thereby, adapted to hold one end of the blank and cause the can-body to be formed around the horn by the rotation of the horn, an edge-folding device for forming a hook on the opposite end of the blank, and mechanism for causing the two hooks to overlap and engage each other around the horn, the horn being of less diameter than the can-body to be formed thereon, substantially as specified.

57. The combination, with a rotatable can-body-former horn, of an edge-folder F mounted movably therein, and an opposing die F', substantially as specified.

58. The combination, with a rotatable can-body-former horn, of an edge-folding or hook-forming device carried thereby and a stop blade or device for engaging or holding the previous hook formed upon the blank, substantially as specified.

59. The combination, with a rotatable can-body-former horn, of an edge-folding or hook-forming device carried thereby, a stop blade or device for engaging or holding the previous hook formed upon the blank, and a guide shoe or device for pressing the blank against the horn and carrying the lap around so that one of the hooks on the blank will overlap the other, substantially as specified.

60. The combination, with a rotatable can-body-former horn, of an edge-folding or hook-forming device carried thereby, a stop blade or device for engaging or holding the previous hook formed upon the blank, a guide shoe or device for pressing the blank against the horn and carrying the lap around so that one of the hooks on the blank will overlap the other, and a device for interlocking or pushing the hooks together, substantially as specified.

61. The combination, with a rotatable can-body-former horn, of an edge-folding or hook-forming device carried thereby, a stop blade or device for engaging or holding the previous hook formed upon the blank, a guide shoe or device for pressing the blank against the horn and carrying the lap around so that one of the hooks on the blank will overlap the other, a device for interlocking or pushing the hooks together, and a seam-squeezing device, substantially as specified.

62. The combination, with a rotatable can-body-former horn, of an edge-folding or hook-forming device carried thereby, a stop blade or device for engaging or holding the previous hook formed upon the blank, a guide shoe or device for pressing the blank against the horn and carrying the lap around so that one of the hooks on the blank will overlap the other, a device for interlocking or pushing the hooks together, a seam-squeezing device, and a horn-supporting device, substantially as specified.

63. The combination, with a rotatable can-body-former horn, of an edge-folding or hook-forming device carried thereby, a stop blade or device for engaging or holding the previous hook formed upon the blank, a guide shoe or device for pressing the blank against the horn and carrying the lap around so that one of the hooks on the blank will overlap the other, a device for interlocking or pushing the hooks together, a seam-squeezing device, a horn-supporting device, and a can-body extractor, substantially as specified.

64. The combination, with a rotatable horn furnished with means for clamping one edge of the sheet, of a stop blade or device for engaging the opposite end of the sheet, substantially as set forth.

65. The combination, with a rotatable horn furnished with means for clamping one edge of the sheet, of a stop blade or device for engaging the opposite end of the sheet and a guide-shoe for carrying the lap around the horn and causing the hooks to overlap, substantially as specified.

66. The combination, with a rotatable horn, of a seam-squeezer device having a rotary or swinging movement about a pivot so that the seam is squeezed as the horn and squeezer roll together, substantially as specified.

67. The combination, with a rotatable horn, of a tapering horn-support to permit the can-body to enter between the horn and support, substantially as specified.

68. The combination, with a rotatable horn, of a stationary horn-support and a pivotal or rotary seam-squeezing device on the opposite side of the horn, substantially as specified.

69. The combination, with a rotatable horn furnished with means for clamping the edge or end of the sheet thereto, of a device for holding the opposite edge or end of the sheet against the horn and means for interlocking the hooks on the blank, substantially as specified.

70. The combination, with a rotatable horn furnished with means for clamping the edge or end of the sheet thereto, of a device for holding the opposite edge or end of the sheet against the horn and means for interlocking the hooks on the blank, said horn having a forward and backward rotary movement, substantially as specified.

71. The combination, with a rotatable horn furnished with means for clamping the edge or end of the sheet thereto, of a device for holding the opposite edge or end of the sheet against the horn, means for interlocking the hooks on the blank, said horn having a forward and backward rotary movement, and a seam-squeezer, substantially as specified.

72. The combination of a backward and forward rotatable horn, a hook-former carried thereby, a hook-holder or stop-blade H, movable guide or shoes $H^2$ and K, and fixed guide-shoe L, substantially as specified.

73. The combination of a backward and forward rotatable horn, a hook-former carried thereby, a hook-holder or stop-blade H, movable guides or shoes $H^2$ and K, fixed guide-shoe L, seam-squeezer P, and hook-interlocking device $p$, carried by said seam-squeezer, substantially as specified.

74. The combination, with a rotatable can-body-former horn, of edge-folder F pivoted thereto, die F', and movable wedge $g$ for closing said former F against the die, substantially as specified.

75. The combination, with a rotatable can-body-former horn, of edge-folder F pivoted thereto, die F', movable wedge $g$ for closing said former F against the die, and a spring for opening said former, substantially as specified.

76. The combination, with a rotatable can body-former horn G, of edge-folder F, die F', and feed-passage E for the blanks, substantially as specified.

77. The combination, with a rotatable can-body-former horn G, of edge-folder F, die F', a feed-passage E for the blanks, and a pusher device Q for forcing the blanks into position between said die and edge-folder, substantially as specified.

78. The combination of a rotatable can-body-former horn of less diameter than the body to be formed, a first edge-folding mechanism arranged and adapted to form a hook of a determinate width on one end of the blank and a second edge-folding mechanism carried by the horn and arranged and adapted to form a second fold or hook of a determinate width, whereby can-bodies of fixed sizes may be produced, substantially as specified.

79. The combination of a can-body-former horn and mechanism for forming the body-blank around the horn and seaming or interlocking its meeting edges or ends, the horn being smaller than the can-body to be formed thereon, with a can-body-extractor device adapted to press against the surface of the horn and push the can-body off the horn, substantially as specified.

80. The combination, with a can-body-former horn and mechanism for forming the body-blank around the horn and seaming or interlocking its meeting edges or ends, the horn being smaller than the can-body to be formed thereon, of an extractor T, having a curved face corresponding to the periphery of the horn, substantially as specified.

81. The combination, with a loose-fitting can-body-former horn and mechanism for forming the body-blank around the horn and seaming or interlocking its meeting edges or ends, the horn being smaller than the can-body to be formed thereon, of an extractor T and a reciprocating slide T', to which said extractor device T is connected, substantially as specified.

82. In a can-body-making machine, a backward and forward rotatable horn, a device for squeezing the seam against the horn, and mechanism for rotating said horn backward and forward, substantially as specified.

83. The combination, with a can-body-former horn of smaller diameter than the can-body to be formed thereon, of a device for pushing together or interlocking the hooks formed upon the blank, and mechanism for rotating said horn backward and forward, substantially as specified.

84. The combination, with a rotatable horn having a movable hook-former to clamp one edge of the blank to the horn and thus wrap the blank around the horn by the rotation thereof, of a movable hook-interlocking device $p$, substantially as specified.

85. The combination, with a horn, of a shoe or pressure device for clamping the body against the horn and carrying the lap around so that the hooks on the blank will overlap, and mechanism for rotating the horn in both directions, substantially as specified.

86. The combination of horn G with holder H, a pressure-shoe K, and a mechanism for rotating the horn in both directions, substantially as specified.

87. The combination, with a rotatable horn, of a shoe or pressure device for clamping the body against the horn and carrying the lap around so that the hooks on the blank will operlap and a hook pushing or interlocking device, substantially as specified.

88. The combination, with a rotatable horn, of a shoe or pressure device for clamping the body against the horn and carrying the lap around so that the hooks on the blank will overlap, a hook pushing or interlocking device, and a seam-squeezing device, substantially as specified.

89. The combination, with a rotatable can-body-former horn, of an extractor device for pushing the can-bodies off of the horn and mechanism for rotating the horn in both directions, substantially as specified.

90. The combination, with a rotatable can-body-former horn carrying a movable device for clamping one end of the blank thereto, of a stationary guide-shoe L, having a projection L', substantially as specified.

91. The combination, with a rotatable can-body-former horn furnished with a movable jaw F and die F', of a device for feeding the blanks thereto, mechanism for interlocking the hooks, and mechanism for squeezing the seam, substantially as specified.

PETER JORDAN.

Witnesses:
H. M. MUNDAY,
EDMUND ADCOCK.